United States Patent Office 3,174,844
Patented Mar. 23, 1965

3,174,844
METHOD OF FERTILIZING TURF WITH A NON-BURNING FERTILIZER
Grover L. Bridger, Baltimore, and John F. McCullough, Ellicott City, Md., assignors to W. R. Grace & Co., New York, N.Y., a corporation of Connecticut
No Drawing. Filed Jan. 23, 1963, Ser. No. 253,301
4 Claims. (Cl. 71—34)

This invention relates to fertilizer materials suitable for application to plant life. In one specific aspect, it relates to non-burning fertilizers adapted for application as aqueous dispersions directly to plants. In another specific aspect, it relates to methods of fertilizing plants.

It is a well-known fact that germination of seeds may be prevented or established crops may be injured by the presence of too much soluble salt in the soil. This phenomenon may occur even though all of the elements which the plant requires for its proper nutrition are present in normal proportions to one another and substances that exhibit specific plant toxicity effects are not present in excess. This type of injury must therefore be connected with the high concentration of salts in the soil solution, and it has been commonly thought that the elevated osmotic pressure of such solutions is responsible for such injury. This has been borne out by experimental studies which have clearly demonstrated that growth reduction of several crops was linear with the increasing osmotic pressure of the substrate over a range from 0.4 to 4.4 atmospheres and that a number of crop species dies when the osmotic pressure of the culture reached 4.5 atmospheres.

Except under unusual conditions the osmotic pressure of the soil solutions should never become high enough to injure the crop when fertilizer is carefully uniformly broadcast. However, almost inevitably some portions of fertilizer become localized in restricted zones, in which case the soluble portion of the fertilizer dissolves only in the soil moisture immediately surrounding these zones. This results in local areas of salt solution many times as concentrated as was intended, and not infrequently, injury to plants follows if due precautions are not taken. Simply reducing the amount of fertilizer to avoid injury might mean going below the optimum amount of plant food or necessitate repeated applications of plant foods.

The osmotic pressure produced in the soil solution by a given salt application is the result of many factors. Among these may be mentioned the quantity of salt added, the amount of moisture in the soil, base exchange and other reactions into which the added salt may enter, temperature, and the amount of biological action in the soil.

Some fertilizers react with the constituents of the soil to a much greater extent than others. A mixture containing a high proportion of soluble salts that undergo fixation in the soil may therefore increase the concentration of the soil solution less than one containing a lower percentage of soluble salts that are not fixed in the soil. The soluble salt content of different fertilizer mixtures cannot therefore be employed as the sole criterion for their influence on the soil solution.

As well, the composition of the fertilizer, especially the relative proportion of divalent and monovalent elements is of particular importance insofar as the dissociation of the fertilizer salts into ions is concerned. It must be recalled that osmotic pressure, as a colligative property of solutions, is dependent primarily on the number rather than the nature of the particles formed. However, the larger and more complex the particles, the less likely they are to affect the properties of the solution, since pure colligative properties are exhibited to the greatest degree in ideal solutions. Hence, it is not difficult to see why larger units, such as phosphates and free ammonia, have the least effect on this situation.

The actual damage done is an effect known as "burning" because firing or scorching of the leaves of the plants is often a symptom of such injury. In general, water enters the plant too slowly to compensate for that lost by transpiration or else it actually passes from the roots by osmosis. The reason for such a transaction is easily understood when the principle of osmosis is recalled. Osmotic pressure represents the tendency of the solvent, in this case water, to pass through a semipermeable membrane, in this case the cell wall, from a region containing a solution of high vapor pressure, in this case the interior of the cells of plants, to one of lower vapor pressure, in this case, the exterior of the cells of plants, i.e., the surface of the plant. This situation of unequal vapor pressures is due to the difference in the concentrations of the "solutions" on the two sides of the cell wall. On the one side, there is the fertilizer dissolved in the moisture available in the soil. This makes a fairly concentrated solution. On the other side, i.e., on the inside of the cell, the solution comprises protoplasm, a viscid, grayish, translucent, colloidal substance of granular structure and complex composition. In it are dissolved the minerals, enzymes, and other constituents necessary for the life of the cell.

When the vapor pressure outside the cell is sufficiently low, the water from the protoplasm leaves the cell, thereby resulting in protoplasmic shrinking or plasmolysis. The ultimate result is the total destruction of the cell. It is such destruction that is generally termed plant burning, and is, as has been shown, a direct consequence of heedless fertilization.

In recent years, considerable interest has been developed in the growth and care of flowers and ornamental shrubs. This has resulted in a phenomenal growth in the demands for fertilizers adapted for application to these plants as well as to lawns. However, it is obvious that chemical fertilizers such as those used on economic crops are not well adapted for application to lawns, for the reason that with most economic plants, fertilizers are normally applied underground at the time of planting; or if applied after plant growth has started, they must be applied some distance from the plant roots but still underground. It is apparent that this type of application is not suited to lawns, because such fertilizers are normally readily soluble, and their application to plants produces a certain amount of burning or plasmolysis. This problem can be avoided by making several applications of fertilizer during the growing season. However, this means considerable work must be expended.

Another method is to apply the so-called "non-burning" fertilizers, conventional fertilizers which are pelleted to reduce dissolution. But even with the best of mechanical spreaders, fertilizers of this type cannot be applied evenly owing to the nature of the material. Various mixtures have been provided for dissolution in water and application to grasses as solutions. However, this type of fertilization is subject to the objection discussed above, in that the solution must be applied sparingly in order to avoid burning. Consequently, numerous applications must be made during the course of a year.

It is known that metal ammonium phosphates exhibit the property of non-burning to a high degree. These compounds have the advantage of being slowly soluble over extended periods, so that they are not leached out or carried deep into soil by water. It has been well demonstrated that owing to the nature of the ions into which it ultimately disintegrates, the overall colligative properties are such as to practically preclude burning. Further, they are excellent nutrient sources, in that they provide not only necessary metallic cations, but also nitrogen and phosphorus in such a way as to be readily utilizable by plants. Widespread success has been met with the application of these materials around and under such sensitive plants as tree seedlings and the like. Further, it has been shown that aqueous dispersions of metal ammonium phosphates are extremely successful in achieving plant nutrition by applying such slurries to the aerial portion of the plants being fertilized. However, the preparation of such slurries can be both time consuming and expensive, since the compounds must be either prepared, or purchased dry and dispersed in water.

It is an object of this invention, therefore, to provide an inexpensive fertilizer mixture adapted for application to lawns as an aqueous dispersion without danger of burning the lawns. It is a further object of this invention to provide a long-lasting, non-leaching fertilizer for grasses which will efficiently supply nutrients to plants at an optimum rate. It is still a further and more specific object of this invention to provide a simple method for obtaining slurries of metal ammonium phosphates for wide-spread application for lawns and the like. Further objects will become obvious in the light of the following discussion.

We have found that it is possible to provide a dry mixture of certain fertilizer ingredients which can be dispersed in water, and which, upon being agitated in an aqueous medium, will react to form a finely divided flocculent material. Further, such material can be readily handled in spray equipment and can be maintained in suspension with a minimum amount of agitation.

In accordance with the present invention, ammonium phosphate, either monoammonium phosphate or diammonium phosphate, or mixtures thereof, may be added to an agitated body of water along with divalent metal compounds (e.g., finely divided $Mg(OH)_2$, or $MgO$, $ZnO$, $ZnSO_4$, $MgSO_4$, $FeSO_4$, $MnSO_4$, $CuSO_4$, etc.) and potash if desired, to form in situ a dispersion of metal ammonium phosphates. The result is a finely divided dispersion of complete fertilizer which can be readily applied to lawns without the danger of causing plasmolysis. By the use of appropriate spray equipment, this fertilizer dispersion can be applied evenly over an entire lawn. Since the metal ammonium phosphates are only slowly soluble, a single application has proved to be adequate for an entire growing season.

The different aspects of our invention can be readily understood in view of the following discussion.

For present purposes, diammonium phosphate of fertilizer grade is the phosphate of choice as a source of $P_2O_5$. Inasmuch as a metal ammonium phosphate fertilizer should contain magnesium as the principal metallic cation, for illustrative purposes, the reaction of magnesia with the selected phosphate is considered. Tests have shown that virtually any concentration and grade of ammonium phosphate is suitable for our invention. The only stipulation is that allowance be made for the actual amount of N and P present in determining the amounts of the other reactants to be added. Further, magnesium hydroxide can easily be used instead of magnesia, except that it is somewhat less reactive.

The reaction of magnesia with di and monoammonium phosphates occur as follows:

(1) 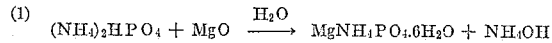

(2) 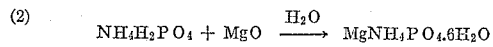

It is readily apparent that under ordinary circumstances, the reaction of Equation 2 would be the preferred way of making the fertilizer of the present invention since it does not yield any free ammonia, which might cause some burning if released in too high a concentration, or if not that, would not be retained in soils for extended periods. However, diammonium phosphate is made and sold commercially as a fertilizer material, whereas monoammonium phosphate is ordinarily available only as a pure chemical. It must be noted that the diammonium phosphate conventionally marketed as fertilizer grade is actually a mixture of mono and diammonium phosphates, the ratio of the two salts being such that composition corresponds to a 16–48–0 or 18–46–0 N—$P_2O_5$—$K_2O$ mixture. An aqueous dispersion of magnesium ammonium phosphate formed from fertilizer-grade diammonium phosphate normally has a pH of between about 8 and 9. However, this pH is readily reduced by the use of copperas along with the magnesia, to react in accordance with the following equation:

(3) $FeSO_4.7H_2O + (NH_4)_2HPO_4 \rightarrow$
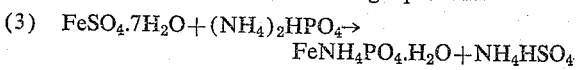

We have found that satisfactory pH control can be maintained in a material consisting of magnesia and ammonium phosphates by the substitution of a predetermined amount, up to about 30% on a mole basis, of copperas for the magnesia. (Higher concentrations of copperas can be used, but a decreased pH of the final product will be a necessary consequence.) The result is a mixture of magnesium ammonium phosphate, ferrous ammonium phosphate, and dissolved ammonium sulphate in an aqueous suspension. By controlling the ratio of magnesia to copperas, the pH of the resulting solution can be controlled to values between 6 and 9, which is safe for the equipment used in applying this material. Lower pH values can be obtained, but if this is done, care must be taken to prevent corrosion in the fertilizer dispensing equipment.

In addition, there are further advantages to the use of this method. Ammonium sulphate, being soluble in water, provides ammonia in non-burning quantities which is immediately available to the plants, and which thereby produces immediate response. Further, the ferrous ammonium phosphate is extremely valuable as an agent in combating iron chlorosis in growing plants. It has been noted that grasses to which ferrous ammonium phosphate has been applied show a response within two or three days by the development of a richer, greener color.

If it is preferred for some reason, however, not to add iron, equally satisfactory pH control can be achieved by blending a suitable amount of other metal sulfate, such as $MgSO_4$ into the reaction mixture instead of copperas.

Another advantage provided by our invention is that necessary trace elements, such as manganese, cobalt, copper, zinc, and the like can be readily incorporated into the fertilizer mixture. This may be accomplished by adding to the dry fertilizer mix a predetermined necessary amount of the trace element as an oxide or soluble salt. Reactions similar to those for magnesium and iron take place when the mix is finally agitated with water, thereby resulting in the formation of trace element metal ammonium phosphates. Inasmuch as these elements would only be used in small quantity if at all, little concern need be given to their effect upon the pH of the final mix.

In order to complete the fertilizer composition, it is desirable to add a small amount of potash, preferably as magnesium potassium phosphate, but it may likewise be added as potassium chloride, potassium sulfate, or potassium nitrate. However, it must be kept in mind that the principal nutrients needed for the proper growth of grasses and ornamental shrubs are ammonia available phosphate, and $K_2O$.

As desired or needed, pesticides or weed killers can be added to the fertilizer suspension and applied therewith. Thus, in one application there can be applied immediately available fertilizers as soluble ingredients, slowly soluble materials for plant uptake during the remaining portion of the growing season, and weed killers or pesticides to rid the lawn of undesirable growth, both plant and animal.

Experimentation was performed for the purpose of determining the characteristics of the products described above with special interest in the following areas: (1) factors affecting pH and conversion to metal ammonium phosphates; and (2) stability of the spray premix during storage. The relationship of these factors to the success of the final slurry as a fertilizer is obvious in the light of the foregoing discussion.

(1) *Factors affecting pH and conversion to metal ammonium phosphates.*—The experimentation in this area was designed for the determination of the degree of conversion to metal ammonium phosphates under various conditions and with various raw materials. This was done by determining the amount of nitrogen and $P_2O_5$ in the insoluble portion of the reacted spray slurry. The general procedure used is as follows:

The dry ingredients were initially blended together in a beaker, generally using a minimum of 65 grams of diammonium phosphate. Thereafter, the dry mixes were added to water with good stirring; generally 12.7 parts water per part diammonium phosphate were used. The resulting slurries were then stirred at room temperature for various periods of time; pH determinations were made at 15 minute intervals. The slurries were filtered on a Büchner funnel, and the filter cakes were washed on the filter with three portions of water; each portion contained 6.15 parts of water per part diammonium phosphate. The washed filter cakes were finally dried to constant weight at room temperature.

All of the products were analyzed for total and water soluble nitrogen and total $P_2O_5$. Ferric and ferrous iron was determined when ferrous sulfate was used. The products usually contained 0.4% to 0.5% water soluble nitrogen. This is about normal for well-washed metal ammonium phosphates. The yield of insoluble nitrogen was used as a measure of conversion to metal ammonium phosphate. The yield of insoluble nitrogen was calculated as the ratio of total nitrogen in the product to the total nitrogen in the starting materials.

The effect of nitrogen to phosphorus ratio on yields of $MgNH_4PO_4 \cdot 6H_2O$ was carefully investigated. Quantities of $NH_4H_2PO_4$ (having a N/P mole ratio of 1.0) and $(NH_4)_2HPO_4$ (having a mole ratio of 2.0) were combined to give N/P mole ratios ranging from 1.0 to 1.75. These mixtures were reacted with stoichiometric amounts of MgO. The results of these experiments are shown in Table I below.

TABLE I

Effect of nitrogen to phosphorus ratio on conversion to $MgNH_4PO_4 \cdot 6H_2O$

| Mole ratio N/P | 1.00 | 1.25 | 1.50 | 1.75 |
|---|---|---|---|---|
| Yield of $MgNH_4PO_4 \cdot 6H_2O$ [1] | 52.2 | 49.1 | 43.3 | 40.9 |
| Yield of Insoluble $P_2O_5$ [1] | 56.5 | 50.3 | 43.0 | 40.3 |
| pH of slurry | 5.0 | 6.5 | 7.0 | 8.0 |

[1] Theoretical is 100%.

The results shown in this table indicate that the lower the N/P ratio, the lower the pH and higher the yield. We have found that where no metal sulfate is used, materials having a N/P mole ratio of 1.25–1.30 are most satisfactory in that they may be obtained at relatively low cost with little sacrifice in success. Further, this avoids the corrosion problem, which would have to be contended with should the final pH of the slurry be too low.

Similar experiments in which metal sulfate was used as a fertilizer ingredient indicate that under this condition, the best N/P mole ratio is about 1.69, corresponding to an N—$P_2O_5$—$K_2O$ weight ratio of 16–48–0.

The effect of $MgO/P_2O_5$ ratio on conversion to insoluble nitrogen and $P_2O_5$ was determined. The range investigated was 90% to 110% of the stoichiometric amount of MgO based on $P_2O_5$. The source of $P_2O_5$ was a 16–48–0 preparation similar to the one used above. The dry ingredients were added to 12.7 parts water per part 16–48–0 and stirred for one hour.

The results of these tests showed that the conversion to both insoluble nitrogen and $P_2O_5$ drop sharply at mole ratios less than 1.88. Between mole ratios of 1.88 and 2.20, yields of both nitrogen and $P_2O_5$ increased linearly with an increasing mole ratio. The rates of increases were not large, however; increases of 1.2% in the conversion of nitrogen and $P_2O_5$ to insoluble compounds are indicated when the ratio is increased from 2.0 (stoichiometric amount) to 2.20 (10% excess MgO). In the range studied, the $MgO/P_2O_5$ ratio did not have much effect on pH. When a ratio of 1.80 was used, the final pH was 7.62; with a ratio of 2.20, the final pH was 8.01. It was concluded that the increase in conversion to insoluble nitrogen is not large enough to justify the added expense of using an excess of MgO.

The optimum amounts of ferrous sulfate and magnesium sulfate for maximum conversion to insoluble nitrogen and $P_2O_5$ were experimentally determined. Dry blends containing $MgSO_4 \cdot 7H_2O$ or $FeSO_4 \cdot 7H_2O$, MgO, and granulated 16–48–0 were prepared; the stoichiometric total metal ($MeSO_4$+MgO) was used. Mole fractions of total metal as metal sulfates ranging from 0.05 to 0.60 were used. The dry blends were added to 12.7 parts water per part 16–48–0 ammonium phosphate and stirred for one hour. The results of these studies indicated that maximum conversion to insoluble nitrogen and $P_2O_5$ occurs at mole fractions of both $MgSO_4$ and $FeSO_4$ of 0.275. The maximum conversion to insoluble nitrogen was about 48% with $FeSO_4$ and about 43% with $MgSO_4$. With metal sulfates, the conversion to insoluble $P_2O_5$ was about 90% with $FeSO_4$ and about 81% with $MgSO_4$. Without metal sulfates, the conversion to insoluble $P_2O_5$ was about 55%, and the conversion to insoluble nitrogen was about 26.0%.

Measurements of pH were made in relationship to the mole fraction of metal sulfate employed. The data indicated that the pH decreased with increasing metal sulfate, and was most sensitive to metal sulfate concentration between mole fractions of 0.2 to 0.3. There was a pH change of about 1.0 to 1.1 units in this region. At any given mole fraction, $MgSO_4$ gave a lower pH than $FeSO_4$. At a mole fraction of 0.275 (the optimum mole fraction for maximum conversion), the pH was 6.5 with $FeSO_4$ and 6.0 with $MgSO_4$.

During the stirring period, the pH was measured every 15 minutes. The readings obtained indicated that when premixes containing metal sulfates in the concentration of maximum conversion are added to water, a pH of 5.6 to 6.0 is immediately obtained. The pH then increases with time, approaching maximum in about one hour. It was noted that at a mole fraction of $FeSO_4$ of 0.275, the pH was below 6.0 for only 15 to 30 minutes, and if other additives, such as KCl were used, this period becomes even shorter. It is most unlikely that any significant amount of corrosion would result in equipment from the pH being below 6.0 for a few minutes during the preparation of the slurry.

In some fertilizer applications, it is desirable to add potassium ion and/or urea to the soil. Experiments were carried out to determine what effect, if any, KCl and urea have on conversions to metal ammonium phosphate. KCl and urea were added to the premixes in amounts so as to give overall ratio of 2–4–1 (nitrogen-$P_2O_5$—$K_2O$). Stoichiometric quantities of MgO were used and an equal molar amount of $FeSO_4 \cdot 7H_2O$ was substituted for 20% of the MgO. The dry ingredients were added to 12.7 parts water per part of 16–48–0 and stirred for 2 hours. The data obtained indicated that neither KCl nor urea affected conversion to water insoluble nitrogen and $P_2O_5$ when used separately. However, it indicated that KCl and urea used together tended to slightly lower the conversion to insoluble nitrogen but not $P_2O_5$. Further, KCl and urea have no effect on slurry pH when ferrous sulfate is not used. However, when ferrous sulfate was used, the addition of KCl and urea caused an increase in pH of 1.0 to 1.3 units. Consequently, care must be taken if urea is to be employed as an additive to allow for this factor.

Studies were performed to determine the range of slurry concentrations which would be successful in the instant invention. Numerous factors must be taken into account in this area. For example, there must be sufficient water present to enable the premix to be easily blended and applied. On the other hand, the fertilizer concentration must be high enough to effectively supply plant nutrients.

In order to determine the range of acceptable concentrations, determinations were made concerning the effect of slurry concentration on conversion to insoluble nitrogen. Studies were carried out in the range of 0.5 lb. per gallon to 10 lb. per gallon. Dry blends were prepared from 16-48-0, stoichiometric amounts of MgO, and fertilizer grades of KCl and urea. The concentration effect was determined with and without $FeSO_4$; where included, $FeSO_4 \cdot 7H_2O$ was used at a mole fraction of 0.2. It was found that workable slurries were obtained in all instances. The data showed that the yield of insoluble nitrogen increases with increasing slurry concentration. Without $FeSO_4$ the increase was only about 2%; with $FeSO_4$, the increase was about 6%. However, in the selection of slurry concentrations, the effective fertilizer dosage must be taken into account. We have found that concentrations of less than about .4 lb. per gallon are virtually ineffective as fertilizers, and that concentrations of more than about 2.6 lb. per gallon are unwarranted. Most successful results from the point of view of ease of handling and success of fertilization were obtained when slurry concentrations of about 1.2 to 1.3 lb. per gallon were employed. This corresponds roughly to the 12.7 parts water per part diammonium phosphate previously described. In order to obtain maximum conversion to insoluble nitrogen, the slurry can be initially prepared at high concentrations such as 10 lb. per gallon, and then diluted to 1.2 to 1.3 lb. per gallon ultimately for use.

(2) *Stability of the turf spray premix during storage.*—One of the requisites of the premix described is that it be capable of being stored for several years without losing ammonia. Ammonia will be lost during storage if MgO reacts with the diammonium phosphate because $NH_4OH$ is a product of the reaction. To determine whether or not a reaction takes place, stoichiometric amounts of MgO and 16-48-0 were ground together into a fine powder and stored in sealed polyethylene bags. The compounds had maximum opportunity to react, since they had large surface area. No odor of ammonia, a sensitive test, was detected during grinding or when the bags were opened after two months storage. It was concluded that MgO and $(NH_4)_2HPO_4$ do not react when dry; therefore the premix will not lose ammonia during storage if moisture is excluded.

Further, both laboratory and bag tests showed that caking of the premix is not a problem. Premixes which had been milled into a fine powder were not caked after 6 months' warehouse.

Numerous field tests were carried out to determine the success of the formulations heretofore described, and variations thereof. The result of a few of these tests are indicated below.

EXAMPLE I

Field tests were performed to determine the relative success of the premix slurry when applied at different rates. The mixture employed in these tests is given in the formulation in Table II.

TABLE II

*Formulation of premix for field tests*

| Component | Lbs. per ton | Percent by weight |
|---|---|---|
| Diammonium phosphate (16-48-0) | 1,010 | 50.50 |
| Magnesium oxide (97%) | 197 | 9.85 |
| Copperas ($FeSO_4 \cdot 7H_2O$) | 417 | 20.85 |
| Urea (45-0-0) | 181 | 9.05 |
| Muriate of potash (KCl-0-0-62) | 195 | 9.75 |
| | 2,000 | 100.00 |

When the above-described premix was added to water at rates ranging from 0.5–2.6 lbs. per gallon the resulting dispersions contained about 0.253–1.31 lb. of said diammonium phosphate, 0.0493–0.257 lb. of said magnesium oxide, 0.104–0.542 lb. of said copperas, 0.0453–0.235 lb. of said urea and 0.0488–0.253 lb. of said potassium chloride per gallon of water.

Applications of fertilizer were made using the premix slurry at rates of 1, 2, and 4 pounds of nitrogen per 1000 square feet of turf. The slurry concentration used was 1.3 lb. premix per gallon. The results in the table given below are those obtained three weeks following treatment with fertilizer:

TABLE III

*Effect of fertilization rates*

| Pounds of Nitrogen per 1,000 ft.$^2$ | Percent increase over vegetation having no fertilizer |
|---|---|
| 0 | 0 |
| 1 | 63 |
| 2 | 185 |
| 4 | 220 |

EXAMPLE II

A comparison of the effectiveness of premix slurries containing iron as obtained from $FeSO_4 \cdot 7H_2O$ and containing no iron was made. The formulation using iron was the same as that given in Example I. The formulation of the premix having no iron was similar, except that the appropriate amount of $MgSO_4$ was substituted for $FeSO_4$.

At the end of three weeks, both tests showed an improvement of about 185% over unfertilized vegetation; there was no significant difference between the two, probably owing to the fact that the test plot employed was not deficient in iron.

EXAMPLE III

The effect of various additives upon the success of our formulation was investigated. A comparison was made at a period of three weeks following the time of treatment of vegetation which had been subjected to the following slurries:

(1) Basic premix (formulation in Example I);
(2) Basic premix+zytron (O-(2,4-dichlorophenyl)O-methylisopropyl phosphonamidothioate—a plant growth accelerator);
(3) Basic premix+insecticide (DDT);
(4) Basic premix+Dacthal (dimethyl ester of tetrachloroterephthalic acid, a crab grass killer); and
(5) Basic premix+2,4-D (2,4-dichlorophenoxyacetic acid).

The fertilizers were all applied at the rate of 2 pounds of nitrogen per 100 ft.$^2$. The results are tabulated below.

TABLE IV

Effect of additives: Percent increase
No fertilizer _____ 0
Basic premix _____ 185
Basic premix+zytron _____ 230
Basic premix+DDT _____ 130
Basic premix+Dacthal _____ 125
Basic premix+2,4-D _____ 150

EXAMPLE IV

Langbeinite ($K_2SO_4.2MgSO_4$) can be substituted as the source of metal sulfate and potassium in the spray formulation. The final formulation has a $N—P_2O_5—K_2O$ weight ratio of 2–4–1 and contains metal sulfate as $FeSO_4.7H_2O$ equivalent to 24% of the $P_2O_5$; the mole ratio of metal sulfate $K_2O$ is 1.17. It must be kept in mind that langbeinite contains a $MgSO_4/K_2O$ mole ratio of 2.0. Therefore, it is necessary to adjust the ratio of $P_2O_5/K_2O$ when langbeinite is used as the sole source of $K_2O$ and metal sulfate.

To obtain the 2–4–1 ratio described above, langbeinite is used to supply all of the metal sulfate and part of the $K_2O$. The remainder of the $K_2O$ is added as KCl.

The final formulation is given in Table V below.

TABLE V
*Premix formulation using langbeinite*

| Component | Wt. percent Plant Food | | | |
|---|---|---|---|---|
| | Wt. percent | N | $P_2O_5$ | $K_2O$ |
| 16–48–0 | 56.20 | 8.99 | 26.98 | -------- |
| MgO (97%) | 11.00 | -------- | -------- | -------- |
| Urea (45%) | 9.99 | 4.50 | -------- | -------- |
| KCl (62%) | 4.52 | -------- | -------- | 2.81 |
| Langbeinite (21.5% $K_2O$), (18.5% MgO) | 18.29 | -------- | -------- | 3.93 |
| | | 13.49 | 26.98 | 6.74 |

Langbeinite can be used as the source of all the metal sulfate and $K_2O$ by changing the $N—P_2O_5—K_2O$ ratio from 2–4–1 to 3.43–6.85–1.0. The formulation is given in Table VI below:

TABLE VI
*Premix formulation using langbeinite*

| Component | Wt. percent Plant Food | | | |
|---|---|---|---|---|
| | Wt. percent | N | $P_2O_5$ | $K_2O$ |
| 16–48–0 | 58.86 | 9.42 | 28.25 | -------- |
| MgO (97%) | 11.52 | -------- | -------- | -------- |
| Urea (45%) | 10.56 | 4.71 | -------- | -------- |
| Langbeinite (21.5% $K_2O$, 18.5% MgO) | 19.16 | -------- | -------- | 4.12 |
| | | 14.13 | 28.25 | 4.12 |

EXAMPLE V

A comparison was made between the premix slurry of the instant invention, where metal ammonium phosphates are formed when the premix is agitated with water, and a conventional dry fertilizer applied as an aqueous slurry. In the latter, there was no change in the chemical composition of the fertilizer when mixed with water, nor were metal ammonium phosphates present in the mixture. Both fertilizers were tested at rates of 2 pounds of nitrogen per 1000 $ft.^2$ of turf. At three weeks, the results given in Table VII below were noted:

TABLE VII
*Slurry premix vs. conventional slurried fertilizer*

| Fertilizer: | Percent increase |
|---|---|
| None | 0 |
| Conventional slurry | 100 |
| Slurry premix | 185 |

In view of the experimentation described above, we have selected a particular formulation for our fertilizer spray premix which we have found to be particularly successful. Naturally, the composition would be varied depending upon the particular location of the vegetation to be fertilized. The selected premix, indicated below in Table VIII contains nitrogen, $P_2O_5$, and $K_2O$ in the weight ratio of 2–4–1. Stoichiometric amounts of MgO plus $FeSO_4.7H_2O$ based on $P_2O_5$ are used.

TABLE VIII

*Recommended spray premix formulation*

| Component | Wt. percent Plant Food | | | |
|---|---|---|---|---|
| | Wt. percent | N | $P_2O_5$ | $K_2O$ |
| 16–48–0 | 50.49 | 8.08 | 24.25 | -------- |
| MgO (97%) | 9.88 | -------- | -------- | -------- |
| $FeSO_4.7H_2O$ | 20.88 | -------- | -------- | -------- |
| Urea (45%) | 8.98 | 4.04 | -------- | -------- |
| KCl (62%) | 9.77 | -------- | -------- | 6.07 |
| | 100.00 | 12.12 | 24.25 | 6.07 |

Although the effective rate of application would naturally vary with the environmental conditions and fertilizer requirements of the plants being fertilized, we have found that generally, good results can be obtained using applications giving the equivalent of 2 pounds of nitrogen per 1000 square feet.

A consideration of the foregoing description indicates numerous advantages inherent in the instant invention. The fertilizer slurry produced by our method can be easily prepared by personnel having a minimum amount of training. Further, the slurry is uniform and free of lumps which would interfere with application. Processing of the premix is inexpensive, since it entails only blending and bagging the dry ingredients. Also, the premix is capable of being stored for several years without decomposition or caking.

And of course, the fertilizer slurry has all of the advantages common to the very best of liquid fertilizers in general: It can be applied during any type of weather without damage to plants or to the distribution equipment. Additives such as insecticides and weed killers can be conveniently incorporated. And finally, they are readily and easily applied.

We claim:

1. A method for fertilizing turf without burning said turf which comprises spraying a dispersion consisting essentially of about 0.253–1.31 pound of ammonium phosphate having a ratio of $N—P_2O_5—K_2O$ of 16–48–0, about 0.0493–0.257 pound of magnesium oxide, about 0.104–0.541 pound of copperas, about 0.453–0.253 pound of urea, and about 0.0488–0.253 pound of potassium chloride per gallon of water on said turf at a rate corresponding to about 0.5–4 pounds of nitrogen per 1000 square feet of turf.

2. The method according to claim 1 in which the disperson is sprayed on the turf at the rate of 2 pounds of nitrogen per 1000 square feet of turf.

3. The method according to claim 1 in which the dispersion is sprayed on the turf at the rate of 4 pounds of nitrogen per 1000 square feet of turf.

4. The method according to claim 1 in which an effective amount of weed killer is incorporated in the dispersion.

References Cited by the Examiner

UNITED STATES PATENTS

| | | | |
|---|---|---|---|
| 1,949,715 | 3/34 | Hansen | 71—34 |
| 1,953,419 | 4/34 | MacIntire | 71—53 |
| 2,680,680 | 6/54 | Coleman | 71—37 |
| 2,827,368 | 3/58 | Mortenson et al. | 71—53 |
| 2,950,183 | 8/60 | Nikitin et al. | 71—1 |

FOREIGN PATENTS 492,596 9/38 Great Britain.

DONALL H. SYLVESTER, *Primary Examiner.*

ANTHONY SCIAMANNA, *Examiner.*